United States Patent [19]

Ackerman et al.

[11] 4,416,001
[45] Nov. 15, 1983

[54] METHOD AND APPARATUS FOR OPTICALLY READING DIGITAL DATA INSCRIBED IN AN ARCUATE PATTERN ON A DATA CARRIER

[75] Inventors: Richard C. Ackerman, Glenview, Ill.; Alan A. Jewer; Donovan W. Hurlbut, both of Whitewater, Wis.

[73] Assignee: News Log International, Inc., Ft. Atkinson, Wis.

[21] Appl. No.: 210,847

[22] Filed: Nov. 26, 1980

[51] Int. Cl.³ .................... G11B 7/00; G11B 21/10
[52] U.S. Cl. .................................. 369/44; 369/100; 369/97; 250/202; 250/236
[58] Field of Search .............. 369/44, 43, 120–122, 369/100, 111, 112, 93, 97; 358/130, 132, 285, 901, 200, 205, 206, 345, 347, 348; 365/127, 120; 360/97, 76, 77, 101, 2; 250/202, 236, 235, 234; 350/6.4, 6.3, 6.2, 96.15

[56] References Cited

U.S. PATENT DOCUMENTS

| | | | |
|---|---|---|---|
| 3,387,295 | 6/1968 | De Moss | 360/76 |
| 3,564,120 | 2/1971 | Taylor | 358/296 |
| 3,765,743 | 10/1973 | Reaves | 350/6.4 |
| 3,898,629 | 8/1975 | Westerberg | 365/127 |
| 3,963,863 | 6/1976 | Malissin | 369/44 |
| 4,136,261 | 1/1979 | Wada | 360/2 |
| 4,163,600 | 8/1979 | Russell | 369/44 |

OTHER PUBLICATIONS

Laser Focus; Aug., 1979; pp. 30, 32, 34.

Primary Examiner—Alan Faber
Attorney, Agent, or Firm—Thomas R. Vigil

[57] ABSTRACT

Data recorded in non-parallel arcuate paths on a data carrier are read with a laser beam which rotates relative to the data record.

76 Claims, 13 Drawing Figures

FIG. 8 314 CARRIAGE MOTOR

FIG. 9 356 SKEW MOTOR

FIG. 10

| | |
|---|---|
| A | RADIUS MTR COMMON |
| C | RADIUS CONTROL |
| D | RADIUS CONTROL |
| E | Q1 |
| F | Q2 |
| H | Q3 |
| J | Q4 |
| L | 19v UNREGULATED |
| N | GROUND |
| S | Q5 |
| T | Q6 |
| U | Q7 |
| V | Q8 |

SKEW: 1, 2, 3, 4, 5, 6
19v UNREGULATED: 11
5v REGULATED: 12
CARRIAGE: 17, 18, 19, 20, 21, 22

METHOD AND APPARATUS FOR OPTICALLY READING DIGITAL DATA INSCRIBED IN AN ARCUATE PATTERN ON A DATA CARRIER

CROSS REFERENCE TO RELATED ART AND APPLICATIONS

This application is related to Gokey et al U.S. Pat. No. 4,213,040, issued July 15, 1980, Gokey et al Ser. No. 956,426, filed Oct. 31, 1978 now U.S. Pat. No. 4,254,329, Gokey et al Ser. No. 074,095, filed Sept. 10, 1979 and Ackerman et al Ser. No. 181,172 filed Aug. 25, 1980, now abandoned.

BACKGROUND OF THE INVENTION

1. Field of the Invention

The present invention relates to a method and apparatus for optically reading data from an information record or information carrier in which the data is inscribed in an arcuate pattern. More particularly, the invention concerns the retrieval of digital information from a data carrier in which the digital information is stored on a body in non-parallel, spaced-apart rows, the rows extending in an arcuate manner across the body, the rows having equal radii extending from a common line.

2. Description of the Prior Art

Gokey et al U.S. Pat. No. 4,213,040 and Gokey et al Ser. No. 956,426 disclose the provision of digital information in rows and columns on a data carrier, in which access and reading is performed with an X-Y transport adapted for skew correction.

Gokey et al Ser. No. 074,095 provides an information record which takes the form of a disc in which the rows of information are disposed as straight radial lines, arcuate radial lines or circles with respect to the axis of rotation of the disc.

Ackerman et al Ser. No. 181,172 discloses an information record of the type which may be used in practicing the present invention and, in fact, forms the accompanying FIG. 1.

SUMMARY OF THE INVENTION

The object of the present invention is to provide a method and apparatus for optically retrieving digital information from a data carrier in which the advantages of the rectangular carrier (skew correction and the like) is maintained along with the advantages of a constantly rotating and constantly scanning system, while avoiding the disadvantages associated with both types of systems.

According to the invention, digital information is read from a body of material, such as photographic film, paper, various plastics material and the like, in which the data is stored in spaced-apart, non-parallel arcuate rows. The data is scanned by a moving light beam, preferably generated by a laser source, so that the light beam is modulated by the reflective-to-nonreflective character of the data on the data carrier, and as may be augmented by a reflective support behind the carrier, depending upon the material used for the data carrier. The material may vary, depending upon application, and may include paper, coated enamel paper, plastic filament paper, Mylar, Kodalith Pan, Dry Silver, Tri-X, Plus X, Diazo and Vesicular materials.

In one embodiment of apparatus for practicing the invention, the light source is fixed and is guided by mirrors, prisms and the like for emission from a wheel which rotates past the data carrier.

In another embodiment, a preferred embodiment, the light source is mounted on a rotating wheel and the light beam is directed in a similar manner so as to scan the data carrier. Inasmuch as the light path in this embodiment is much shorter than that of the fixed light source type of system, a much greater efficiency is achieved.

According to the invention, the method includes generating a beam of light, preferably a coherent beam of light, directing the beam of light so as to scan a data carrier along arcuate paths which correspond to the arcuate paths of data storage on the data carrier, reflecting the beam of light as modulated by the data and directing the same along a path, and receiving and converting the modulated light beam into electrical signals which correspond to the data stored in the data carrier.

The apparatus for optically reading digital data which is inscribed in an arcuate pattern on a data carrier comprises a data carrier support for receiving and holding a data carrier, a light source operable to emit a beam of light, preferably coherent light, a beam directing means for receiving and directing the beam of light toward the supported data carrier, including means for sweeping the light beam across the data carrier in an arcuate path which corresponds to the arcuate storage pattern of the data on the carrier, and receiving means mounted to receive the light beam after the same strikes the data carrier. As mentioned above, in one embodiment the light source is fixed and the light beam is directed to a beam sweeping structure, while in another embodiment, the light source is rotatably mounted with the beam directing means for causing the light beam to sweep across the data carrier.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

The Data Record

Figure 1:
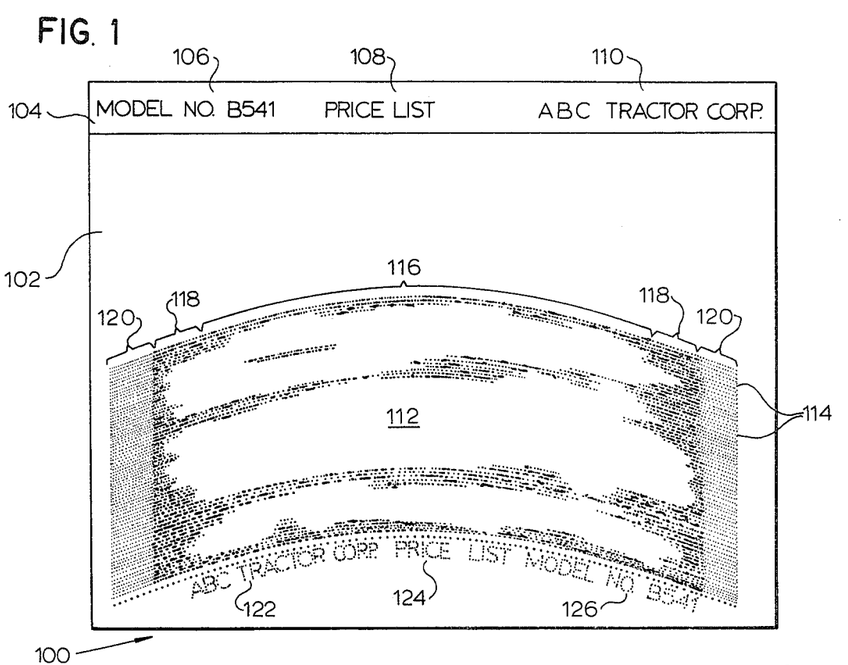
FIG. 1 is a plan view of an information record of the type which may be employed in practicing the present invention.

Before turning to the method and apparatus for reading a data record, reference should be first made to FIG. 1 which illustrates a data carrier for use in practicing the present invention. The data carrier is generally illustrated at 100 as comprising a body 102 which may have a header 104 affixed thereto. The header 104 may include visually perceptible information, as illustrated at 106, 108 and 110, dealing with, for example, the price list relating to a particular model number manufactured by a particular manufacturing organization. This information could also relate to any type of inventory and may find particular use in the banking, hardware, hospital and pharmaceutical areas.

As a particular example, the digital information relating to each element which may be a part of a price list, for example, is recorded in a plurality of non-parallel, spaced-apart rows of information 114 in an area 112 of the body 102.

Although an operating program may tell a machine the address of a row with respect to distance from a datum line, so that the machine itself will respond accordingly to access the proper row, each row may include a row address at either or both ends, as referenced at 118, with the digital information to be retrieved located therebetween, such as at 116. The address information 118 may also be interspersed along the respective arcuate data line, assuming that the hardware and software is set up to read in such a manner.

The record medium may be in the form of paper, plastics or the like, or may be a photographic film in which the background may be transparent or dark and the individual information dots may be of opposite character. The dots themselves may contain the digital information such that a dark dot on a light or transparent background may be considered a "1" or such that a light dot on a dark background may represent a "1". Preferably, however, and notwithstanding the transparency of the background, the information is contained in the opaque-to-transparent and transparent-to-opaque transitions. The transparency and opaqueness of a medium, for example a photographic film, is not limiting with respect to practicing the present invention. The information might be stored with respect to reflective elements carried by the body, whether the body is transparent or opaque. Again, the information may be stored as a result of the reflective material being present or absence, or may be stored with respect to the transitions between the reflective and nonreflective areas.

The camera for producing such a data record also has the capability of providing, in place of or in addition to the information 106, 108 and 110 carried on a header 104, the same or additional information on the film, as indicated at 122, 124 and 126, in the same manner as recording of the digital information. Such information may be graphic and/or digital, where graphic means all types of information, including alphanumeric, drawings, symbols and the like.

The data record may also comprise leader (trailer) indicia 120, which informs the reading device of the beginning and ending of digital information.

THE FRAME AND MAJOR SUPPORTED COMPONENTS

Figure 2:
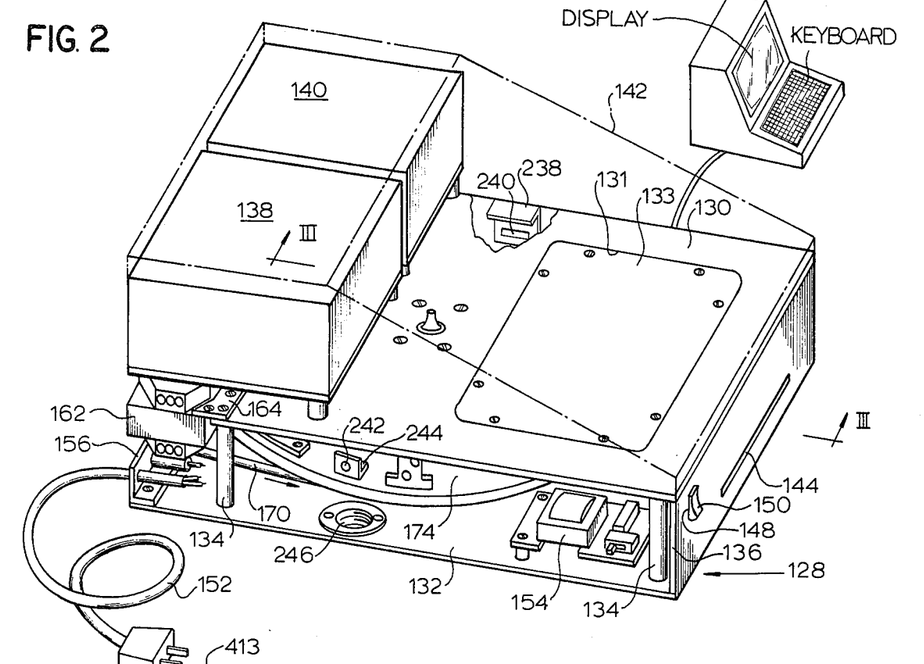
FIG. 2 is an isometric view of an apparatus for practicing the present invention with the outer cover removed, but shown in phantom.
Figure 3:
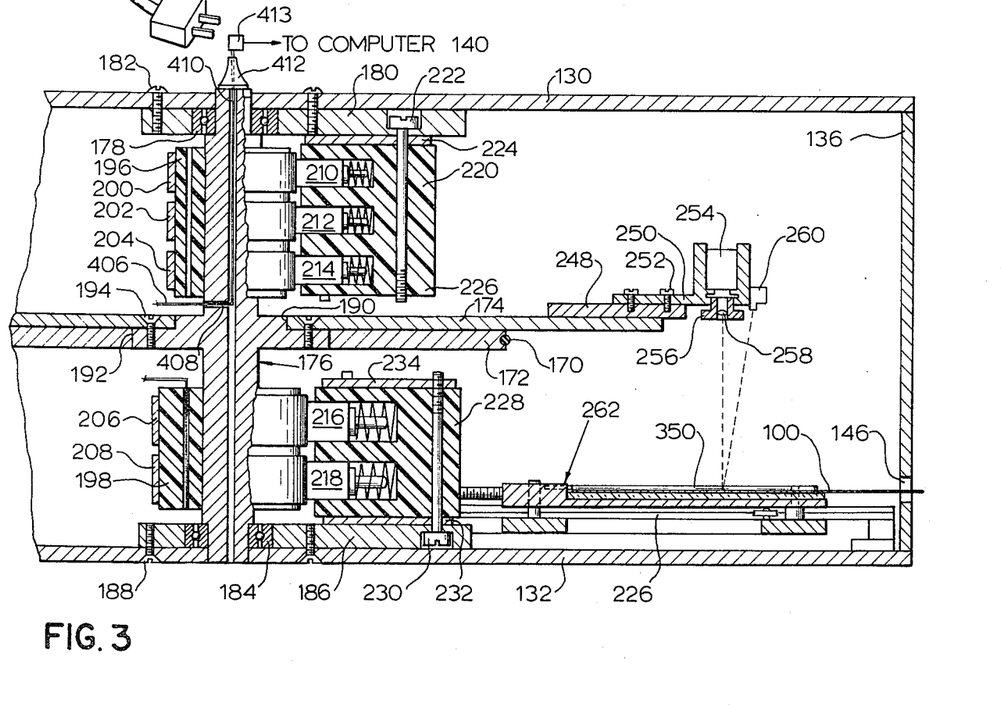
FIG. 3 is a sectional view taken substantially along the parting line III—III of FIG. 2.

Referring to FIGS. 2 and 3, the frame of a preferred apparatus for practicing the present invention is generally illustrated at 128 as comprising a top plate 130 and a base plate 132 which are fixed generally parallel to one another, spaced-apart, by way of a plurality of spacers 134. A front plate 136 is also provided and extends between the top plate 130 and the base plate 132.

The top plate 130 includes an aperture 131 with an access plate 133 and carries, towards the rear thereof, a power supply 138 and a computer 140. The entire structure may be covered with a protective cover 142 which includes a slot 144 for alignment with a slot 146 in the front plate 136 to receive the data record 100 therethrough. The cover 142 may also include an aperture 148 for receiving the operating member of an on-off switch 150.

The on-off switch 150 controls the application of power to the entire unit by way of a line cord and plug assembly 152 and transformer 154, the line cord being received through a mounting bracket 156 at the left-hand, rear corner of the unit.

The power cord 152 may terminate a terminal block 158 which services the power supply 138 by way of a fuse holder 160 and further connections (not shown).

A motor 162 is mounted at the left-hand, rear corner of the unit by way of a mounting bracket 164, and receives power from the terminal block 158 by way of a connector 166 and, possibly, via a motor on-off switch 168.

The motor 162, upon energization, constantly rotates a wheel or disc 174 by way of a belt 170 which is received in a groove 172 of the wheel 174' carried by the wheel 174.

Referring specifically to FIG. 3, a shaft 176 is rotatably mounted between the top plate 130 and the base plate 132. The shaft 176 is mounted in an upper bearing 178 received in a plate 180 which is affixed to the top plate 130 by way of screws 182. In a similar manner, a lower bearing 184 receives the shaft 176 and is mounted in a plate 186 which is affixed to the base plate 132 by way of screws 188.

Figure 5:
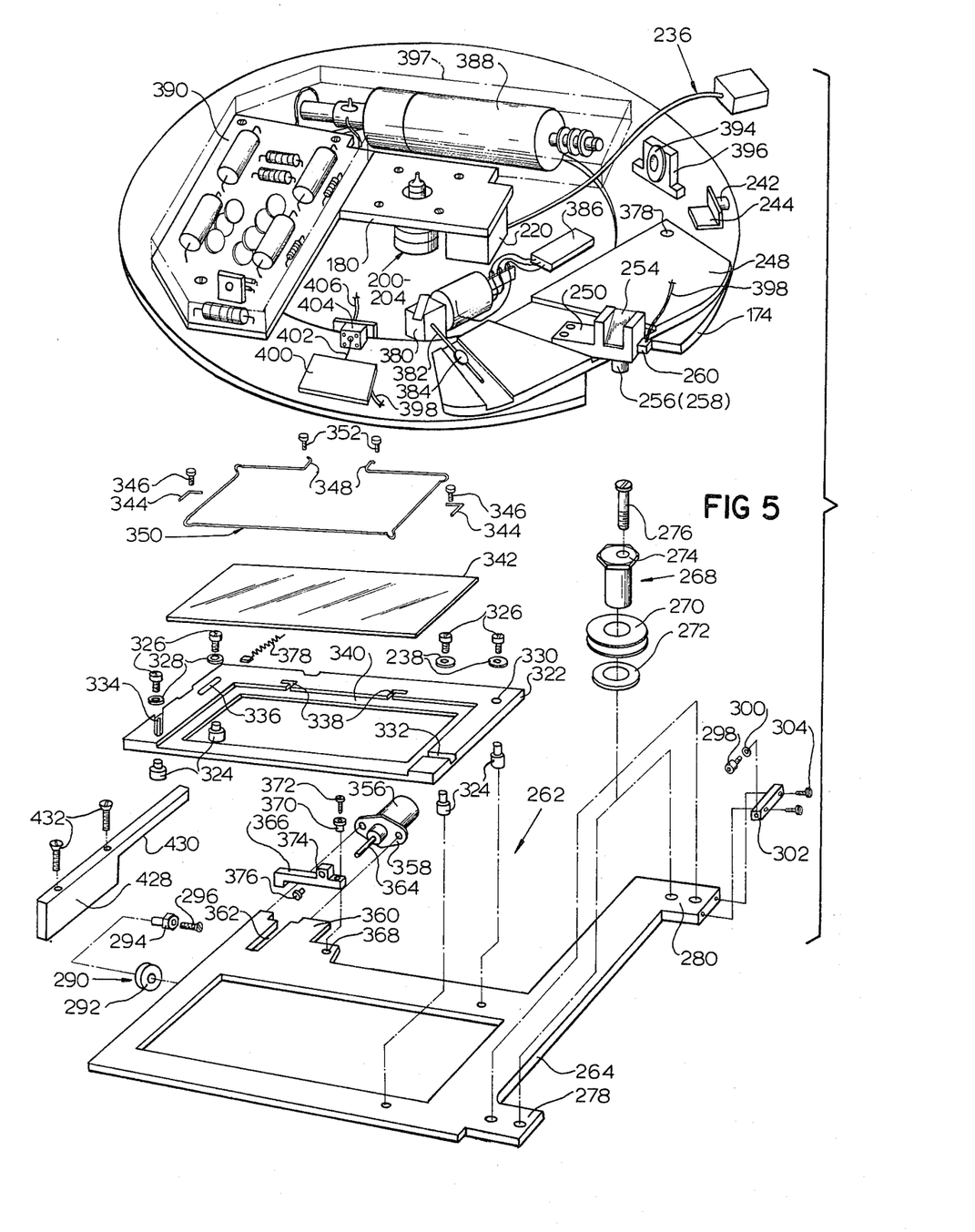
FIG. 5 is an exploded view of the carriage structure of FIG. 4 and a wheel which mounts thereabove and carries the light source and light beam directing structure, and specifically illustrating a radius control motor to compensate for manufacturing tolerances, ambient temperature conditions and the like with respect to the size of the data carrier.

The upper portion of the shaft carries a first slip ring assembly, while the lower portion of the shaft carries a second slip ring assembly. The upper, first slip ring assembly comprises a plurality of slip rings 200, 202, 204 which are insulated with respect to the shaft, while the lower slip ring assembly comprises a pair of slip rings 206 and 208 which are also insulated from the shaft. The upper slip ring assembly comprises respective spring-loaded contacts (brushes) 210, 212, 214, while the lower slip ring assembly comprises a pair of spring-loaded contacts 216 and 218 (brushes). The upper brushes 210, 212, 214 are mounted in an insulating brush holder 220 which is secured to the plate 180 by way of a screw or screws 222 and a pair of plates 224 and 226. In the same manner, the lower contacts are held in a brush holder 228 which is secured to the plate 186 by way of a screw or screws 230 and a pair of plates 232, 234. As seen in FIG. 5, a connector and cable assembly 236 is provided to feed voltage potentials to the upper contacts 210, 212, 214; a similar arrangement being provided, but not shown, for the lower contacts 216 and 218. The contacts 200, 210 may carry, for example, +12 VDC; the contacts 202, 212 may carry ground; the contacts 204, 214 may carry ±19 VDC unregulated for the radius motor; and the contacts 206, 216 and 208, 218 may carry, for example, 700 VAC for the laser.

The wheel 174 includes a central aperture 190 which receives a portion of a stepped flange 192 and is secured thereto by a plurality of screws 194.

As shown and described, the motor 162 by way of the belt 170 rotates the wheel 174 between the top plate 130 and the bottom plate 132.

WHEEL POSITION INDICATOR

In reading data from the data record 100, the computer 140 must know at which time the data will be scanned, that is the computer must know the position of the wheel 174, at least immediately prior to data scanning. For this purpose, and as shown in a cut-away portion of the plate 130 in FIG. 2, a bracket 238 mounts a Hall-effect device and supporting circuit for generating electrical pulses, as clock pulses, in each instance as the wheel 174 carries a mounting bracket 244 mounting a magnet 242 there past. Therefore, for each revolution of the wheel 174, a pulse is delivered to the computer (connections not shown) for clocking data retrieval with respect to rotation.

FOCUSING

Figure 4:
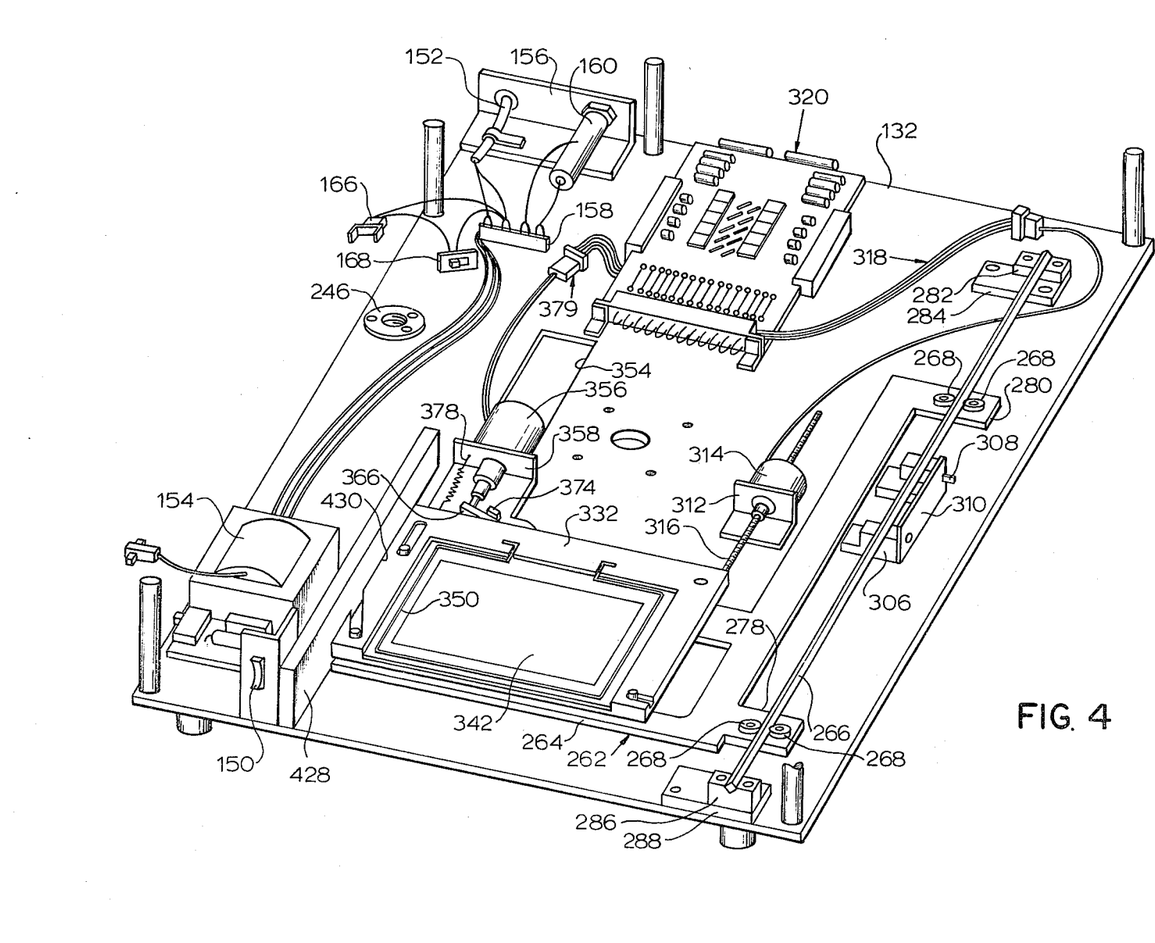
FIG. 4 is an isometric type of plan view of the base plate and apparatus supported by the base plate, including the data carrier support and carriage structure along with the skew correction and carriage incrementing motors.

Referring to FIG. 2, and as also illustrated in FIG. 4, the base plate 132 is provided with a threaded magnifier mounting ring 246. The mounting ring 246, when the unit is placed on its side, for example, receives a 50× magnifier for focusing. For this purpose, the wheel 174 is rotated such that a light beam via a prism 254 and a lens 258 (FIG. 3) are positioned above the mounting ring 246 and the magnifier. The lens 258 may therefore be adjusted to the focal plane of the data record 100, which plane is indicated in FIG. 3.

It should be pointed out here that the wheel 174 carries a plate 248 which mounts a prism holder 250 for holding a prism 254, the prism holder 250 receiving a lens mount 256 having a lens 258 therein. As the light beam, as indicated by broken lines, passes through the lens and is reflected from the media, the same is received, at a slight angle, for example 15°, by a photo detector 260, such as a photodiode or a phototransistor.

THE CARRIAGE STRUCTURE

Turning now to FIGS. 4 and 5, the carriage structure is illustrated in detail as comprising a carrier 264 which is mounted for incremental movement along a track 262 as supported by a plurality of guide wheel assemblies 268 and a guide wheel assembly 290. Each guide wheel assembly 268 comprises a guide wheel 270, a spacer 272, an eccentric bushing 274 and a screw 76. These elements are all on the right-hand side of the unit. On the left-hand side of the unit, supporting the carriage, is a wheel 292 which is adjusted in height by an eccentric bushing 294 and a screw 296 to level the carriage.

FIG. 5 illustrates that the guide wheel assemblies 268 are carried on respective flanges 278 and 280. On the rear flange 280, a magnet 298, via a washer 300 is secured in a magnet mount 302 which is, in turn, secured by way of screws 304 to the end of the flange 280. The magnet 298 cooperates with (FIG. 4) a Hall-effect device 308 and supporting circuitry 310 which is mounted adjacent the track 266 by way of a pair of circuitboard mounts 306. The movement of the magnet 298 toward and away from the Hall effect device 308 (connections not shown) tells the computer 140 whether the carriage 264 is in the home position or is away from the home position.

In order to increment the carriage arcuate line-by-arcuate line, a carriage motor 314 is mounted to the base plate 132 by way of a mounting bracket 312 and includes a lead screw-type output shaft which is rotatably connected to the carriage 264.

As will be understood from a more detailed description below, the carriage motor 314 is controlled by a motor control circuit 320 (detailed in FIG. 6) via a cable assembly 318.

The carriage structure also comprises a skew pivot plate 322 which is mounted spaced from the carriage 264 by way of a plurality of spacers 324 and corresponding washers 328 and screws 326. The plate 322 includes a pivot hole 330, and a plurality of skew-accommodating slots 332, 334 and 336.

The skew plate 322 also includes a pair of L-shaped recesses 338 which open into a recess 340 in the top of the skew plate 322.

The recess 340 receives a glass or mirror plate 342 which is held down by a pair of small L-shaped springs 344 and respective screws 346. The ends 348 of a media holding spring 350 are received in the recesses 338 and secured therein by way of a pair of screws 352.

SKEW CORRECTION

Referring still to FIGS. 4 and 5, the base plate 132 includes an elongate aperture 354 for receiving the body of a skew motor 356 for movement therethrough in accordance with the movements prescribed by the carriage motor 314. The skew motor 356 includes a front mounting bracket 358 which is connected to the rear end of a projection 360 of the carriage 264. The projecting 360 includes a shaped slot 362 for receiving the forward (output shaft) portion 364 of the motor 356, the output shaft 364 contacting a lever 366 which is pivotally mounted at 368 to the carriage 264 by way of a shouldered portion 370 and a screw 372. The lever 366 includes an arm portion 374, and an adjustable screw 376, for contacting and pivoting the skew plate 322, while a skew return or bias spring 378 is connected between the skew pivot plate 322 and the motor mounting flange 358 (FIG. 4).

RADIUS CORRECTION

In reading data from a data record of the type illustrated in FIG. 1, care must be taken to accommodate the manufacturing tolerances and/or the temperature response of the record. For example, the accurate cutting of the data record in the direction across the data, that is vertically in FIG. 1, changes the radius of rotation with respect to the radius of the arcuate pattern. Also, expansion or contraction of the data record due to ambient conditions changes this dimension. Therefore, apparatus is provided for accommodating radius changes due to manufacturing tolerances, ambient temperature and the like.

Referring to the upper portion of FIG. 5, radius correction structure is provided for the light beam emanating from the lens 258. This structure comprises a radius motor 380 which has an output lead screw 382 connected to the plate 248 at a pivot 384, the plate being pivotally mounted on the wheel 174 at a pivot 378 by means of a bushing, screw and the like (not shown). The motor 380 responds to control signals received from a radius motor control circuit 386, which is shown in detail in FIG. 7. As the disc rotates and the initializing operations are performed, the computer determines the direction of movement of the lens 258 and operates the radius motor 380 accordingly.

BEAM GENERATING AND OPTICAL SYSTEM

The light beam is generated, preferably, by a laser generator 388 which is powered by a respective power supply 390 fed from the master power supply 138. The laser generator 388 and the power supply 390 may advantageously be enclosed in a protective cover 392. The beam generated by the laser generator 388 is projected toward the periphery of the wheel 174 where it strikes a mirror 394 mounted on a mirror mount 396 and is reflected to the prism 254 for direction downwardly through the lens 258.

As illustrated in FIG. 3, the light beam through the lens 258 strikes the data record and is reflected therefrom, modulated, to be received by the photo-detector 260. The photo detector 260 has output leads 398 which are connected to a circuit 400 (FIG. 5) which is an optical/optical converter to eliminate noise having an optical output 402 connected to an optical connector 404 which feeds a fiber optic 406.

As illustrated in FIG. 3, the fiber optic 406 is received in a radial passageway 408 and extends up through an axial passageway 410 of the shaft 176 to an optical ferrule 112, whereupon the light emanating therefrom is detected by an optical detector 413 and fed to the computer 140 for buffering and the like.

ALTERNATE OUTPUT STRUCTURE

Figure 11:
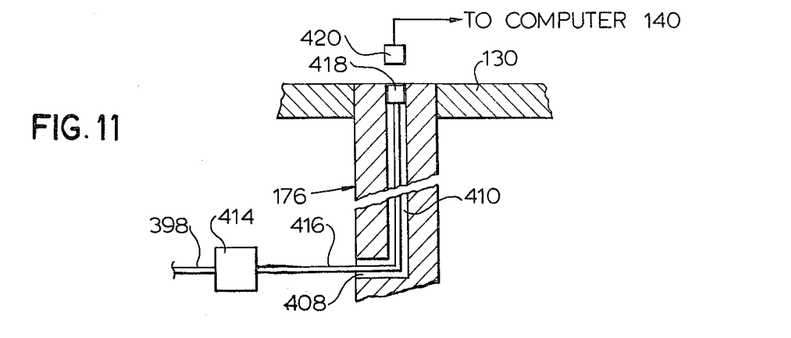
FIG. 11 is a schematic and sectional view of a structure for transferring the modulated light beam as electrical signals to a computer.

A similar output may be had, referring to FIG. 11, by providing the output leads 398 to a circuit 414 which is essentially a pulse shaper having output leads 146 which extend through the radial passageway 408 and the axial passageway 410 of the shaft 176 to a light-emitting element 418, such as a light emitting diode. Again, a photo detector 420, such as a photo diode or a photo transistor converts the light pulses to electrical pulses for feeding to the computer 140 for buffering and the like.

MOTOR CONTROL

Referring to FIGS. 6–10, the motor control apparatus for the motors 314, 356 and 380 will be discussed.

Figures 6, 7, 8, 9, 10:
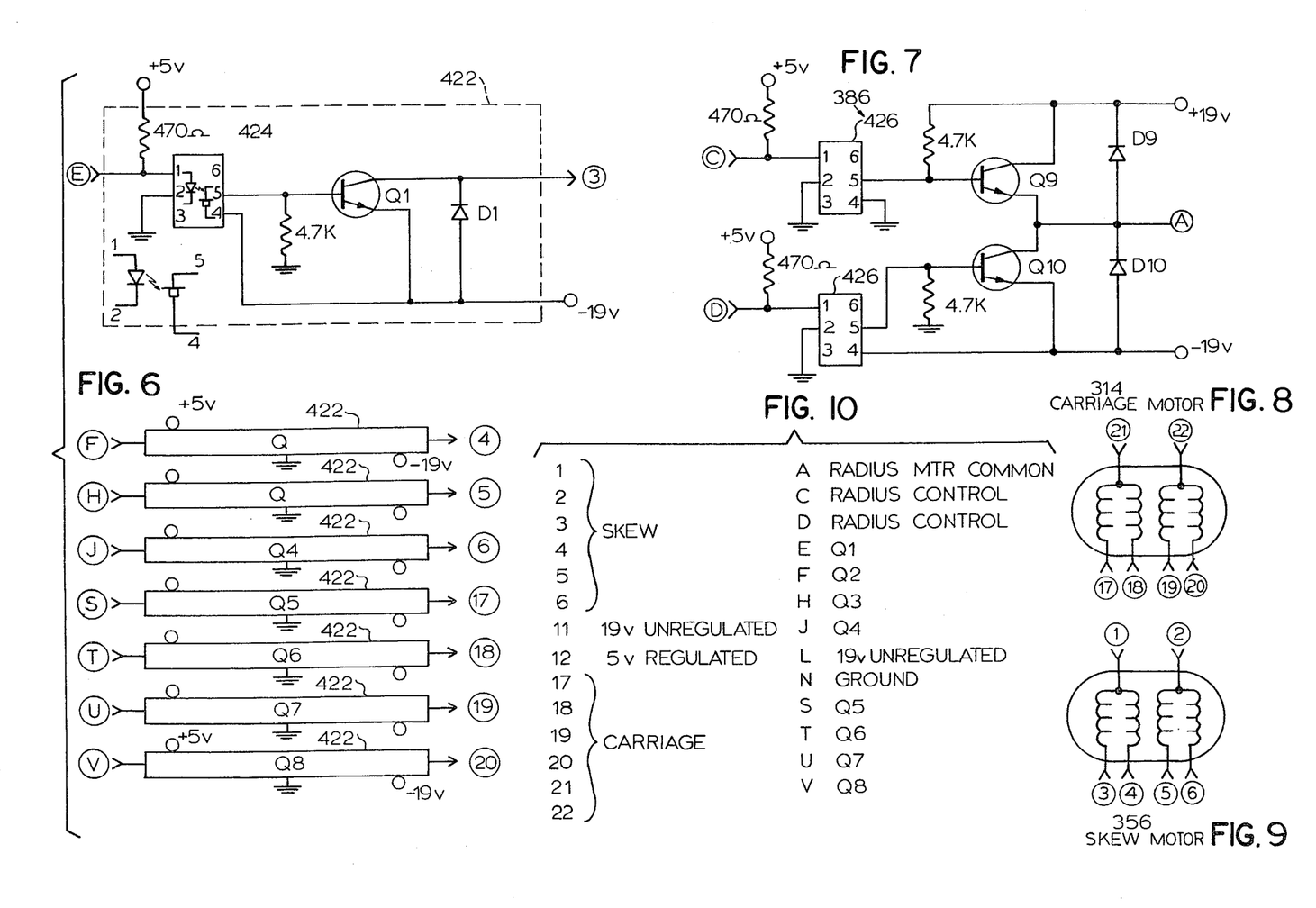
FIG. 6 is a schematic circuit diagram of the motor control circuits for controlling the skew and incrementing motors.
FIG. 7 is a schematic circuit diagram of a motor control circuit for controlling the radius motor.
FIGS. 8 and 9 are schematic illustrations of the incrementing or carriage drive motor and the skew motor.
FIG. 10 shows connector pin assignments for interconnecting the control circuits of FIG. 6 with the motors of FIGS. 8 and 9 and the control inputs effective to cause operation of these motors.

The motor control circuitboard 320 for the skew and carriage motor is illustrated in FIG. 6 as a plurality of identical circuits 422 each comprising an optical isolator 424 and a switching transistor Q. The alphabet letters indicate computer inputs for receiving carriage incrementing and skew adjusting signals, while the numbered outputs indicate, in connection with FIGS. 8 and 9, the connections to the coils of the skew and carriage motors.

The radius motor 380 is similarly controlled, but with a dual circuit comprising optical isolators 426 and respective transistors Q9 and Q10 in order to feed one polarity or another to the skew control motor.

FIG. 10 relates the control inputs and the responsive outputs for the carriage, skew and radius motors with respect to the circuits of FIGS. 6–9.

CARRIAGE RETAINER

For those times during which it is necessary to tilt the unit on its side, for example during the focusing operation, a carriage retaining structure is provided for the left-hand side of the carriage. This structure comprises a L-shaped member 428 which includes a recessed surface 430 (from the bottom), secured to the base plate 132 by way of a pair of screws 432. As the carriage moves toward the front and toward the back, the left-hand edge thereof moves under the cut-out defining the surface 430 for retaining the carriage in the event of tilting for focusing, packing and the like.

ALTERNATIVE EMBODIMENTS

Figure 12:
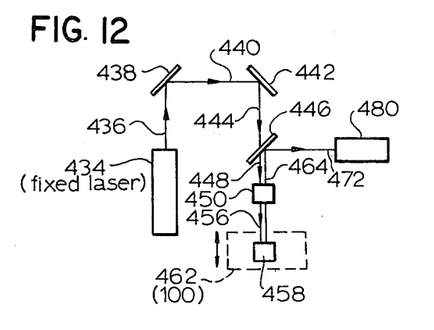
FIG. 12 is a schematic representation of a fixed light source with a rotating beam directing system, as seen from the top.
Figure 13:
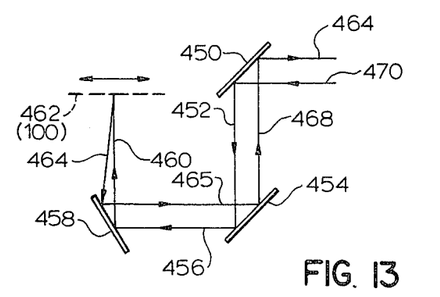
FIG. 13 is a portion of the system of FIG. 12 as seen from the right-hand side.

Referring to FIGS. 12 and 13, FIG. 12 is a top view of an alternative optical system, while FIG. 13 is a portion of the optical system of FIG. 12 as seen from the right-hand side, inasmuch as the optical system of this embodiment covers at least three planes. In FIG. 12, and with a frame similar to that discussed above, a laser device 434 is fixed and emits a light beam 436 which is reflected to the right by a mirror 438 to form a beam segment 440 which, in turn, is reflected forwardly by a mirror 442 to form a beam segment 444. The beam segment 444 travels to a beam splitter 446 which passes a beam segment 448 to a prism 450 (shown as a mirror in FIG. 13 for simplicity) on the axis of the rotating wheel. The prism 450 directs a beam segment 452 downwardly to a second prism 454, also on the axis of rotation which, in turn, directs a beam segment 456 toward a mirror 458 for reflection upwardly toward a data record 462 (100) which is movable incrementally toward the front and toward the back of the unit. The reflected light beam segment 464 again strikes the mirror 458 at a slight angle and is reflected as a beam segment 466 to the prism 454, where the same is redirected as a beam segment 468 to the prism 450. The prism 450 again reflects the modulated beam as a segment 464 to the beam splitter 446 where the modulated beam is reflected as a beam segment 472 to a photo detector 480 for conversion into an electrical signal and transmission to the computer 140 for buffering, output and the like.

It should be noted that in the preferred embodiment of FIGS. 2–5, as far a the mechanical rotating structure is concerned, and in the embodiment of FIG. 11, and in the embodiment of FIGS. 12 and 13, slip rings and the like for outputting the optical signal are not required, although the same could be utilized.

As another alternative, the laser and beam directing system could be generally fixed, but incremented, with respect to a rotating data record.

Also, instead of reflection of a modulated beam, the beam passage through a material having transparent portions could be detected and read with the beam passing through one side of the data record and being detected at the other side of the data record.

COMPONENT SOURCES

With the exception of specific fasteners (screws, washers, etc.) the following TABLE I is a schedule of components listed by reference character and source code. The following TABLE II identifies the sources with respect to the source codes.

TABLE I

| REF. NO. | COMPONENT | SOURCE | SOURCE STOCK NO. |
|---|---|---|---|
| 130 | Top Plate | A | |
| 132 | Base Plate | A | |
| 133 | Access Plate | A | |
| 134 | Support Column (5) | A | |
| 136 | Front Panel | A | |
| 138 | Power Supply, +5 VDC, +12 VDC, −12 VDC, +19 VDC unreg., −19 VDC unreg. | L | |
| 140 | STD Computer Rack | N | |
| 142 | Cabinet | A | |
| 150 | System Power Switch | A | |
| 152 | Line Cord Assembly | K | |
| 154 | Transformer and Board Assembly (Rectifier) | B | LT-05R (part of) |
| 156 | Mounting Bracket | A | |
| 158 | Terminal Strip | E | |
| 160 | Fuse Holder | K | |
| 162 | Drive Motor (Wheel) | E | |
| 164 | Motor Plate | A | |
| 166 | Connector (Motor Power) | K | |
| 168 | Slide Switch (Motor) | K | |
| 170 | Drive Belt | F | |
| 174 | Wheel (Drive Pulley and Extension Ring) | A | |
| 176 | Shaft | A | |
| 178, 184 | Bearing (2) | M | |
| 180, 186 | Top and Bottom Bearing Plates | A | |
| 192 | Flange (Silver Soldered to Shaft) | A | |
| 200–208 | Slip Rings (5) | A | |
| 210–218 | Spring-Loaded Brush (5) | A | |
| 220–228 | Brush Holder Assy. (2) | A | |
| 236 | Connector and Lead Assembly | A | |
| 238 | Bracket for 240 | A | |
| 240 | Wheel Position Circuit Board (Clock, Tach) | A | |
| 242 | Magnet | I | |
| 244 | Magnet Bracket | A | |
| 246 | Magnifier Mount Ring | A | |
| 248 | Radius Plate | A | |
| 250 | Prism Mount | A | |
| 254 | Prism | C | 3309 |
| 256 | Lens Mount | A | |
| 258 | Lens | C | |
| 260 | Photodiode or Phototransistor | V | |
| 264 | Carriage | A | |
| 266 | Track | A | |
| 270 | Guide Wheel (4) | J | 7Q16-1 |
| 272 | Spacer (4) | A | |
| 274 | Eccentric Bushing (4) | A | |
| 282, 286 | Track Block (2) | A | |
| 284, 288 | Riser Block (2) | A | |
| 292 | Guide Wheel (Ball Bearing) | M | |
| 294 | Eccentric Bushing | A | |
| 298 | Magnet | I | |
| 302 | Magnet (298) Mount | A | |
| 306 | Mount (2) for 308, 310 | A | |
| 308 | Hall-effect Switch | H | 276-1646 |
| 310 | Hall-effect Switch Circuit Board | A | |
| 312 | Carriage Motor Bracket | A | |
| 314, 316 | Carriage Motor | D | L92121-P2 |
| 318, 379 | Motor Control Board Harness and Connector Ass'y | A | |
| 320 | Motor Control Circuit Board | A | |
| 322 | Skew Plate | A | |
| 324 | Shoulder Spacer (4) | A | |
| 342 | Plate (Glass, Mirror) | A | |
| 344 | Clip (2) | A | |
| 350 | Media Hold-down Spring | A | |

TABLE I-continued

| REF. NO. | COMPONENT | SOURCE | SOURCE STOCK NO. |
|---|---|---|---|
| 356, 364 | Skew Motor | D | K92121-P2 |
| 366 | Skew Lever | A | |
| 370 | Shoulder Spacer | A | |
| 378 | Skew Return Spring | A | |
| 380 | Radius Drive Motor | C | 8813 |
| 382 | Lead Screw (6-32) | A | |
| 384 | Lead Screw Pivot | A | |
| 386 | Radius Motor Control (FIG. 7) | A | |
| 388 | Laser Tube Assembly | B | |
| 390 | Laser Power Supply | B | LT-05R (part of) |
| 392 | Laser Cover | A | |
| 394 | 21 mm Mirror | C | 30,621 |
| 396 | Mirror Mount | A | |
| 400, 402 | Electro/optical Transducer Circuit | A | |
| 404 | Fiber Optic Connector and Mount | G A | |
| 406 | Fiber Optic | C | |
| 412, 420 | Fiber Optic Ferrule | G | |
| 413 | Opto/Electric Tansducer | V | |
| 414 | Pulse Shaper Circuit | A | |
| 418 | Electro/optical Transducer (LED) | V | |
| 424, 426 | 4N25 | V | |
| Q1–Q10 | 1348 | V | |
| D1–D10 | IN4001 | V | |

TABLE II

| SOURCE CODE | SOURCE |
|---|---|
| A | Special Design by Richard Ackerman for News Log International, Inc., P.O. Box 105, Fort Atkinson, WI 53538 |
| B | CW Radiation, subsidiary, Aerotech, Inc., 101 Zeta Dr., Pittsburgh, PA 15238 |
| C | American Science Center, 5700 Northwest Hgwy, Chicago, IL. 60646 |
| D | Airpax, subsidiary of North American Phillips Co., Cheshire, CN. 06410 |
| E | Lang & Epstein, Dayton St., Chicago, IL 606 |
| F | Midwest Belting, 199 Gaylord Street, Elk Grove Village, IL 60007 |
| G | AMP Inc., Pittsburg, PA, or 1050 Morse, Elk Grove Village, IL 60007 |
| H | Radio Shack, 9515 N. Milwaukee Ave. Niles, IL 60648 |
| I | Micro Switch Division of Honeywell, Inc. |
| J | Stock Drive Products, 55 S. Denton Ave., New Hyde Park, NY 11040 |
| K | Joseph Electronics Inc. 8830 N. Milwaukee Ave. Niles, IL 60648 |
| L | Lab 1, News Log International, Inc., P.O. Box 105, Fort Atkinson, WI 53538 |
| M | Harrison Supply Co., Milwaukee Ave., Wheeling, IL. |
| N | Pro Log Corp. 2411 Garden Ave., Monterey, CA 93940 |
| V | Motorola, National, Semiconductor, Fairchild, Texas Instruments, et al |

METHOD OF OPERATION

The system operates as follows, assuming all components have been placed in their operating conditions, wheel rotating, laser on, etc.

The optical system reads data to determine if the scan crosses data lines so that skew correction is required; skew is then corrected, by operating the skew motor and reading for a skew null.

The optical system reads into the computer which then operates the radius motor to lengthen the optical path until data is transmitted over the optical path indicating a datum from which incrementing any begin.

Subsequently, the data is scanned, row-by-row, and output to the computer for buffering and display. If an input addressing unit, e.g. keyboard, is employed, the supported data record is incremented until the correct data row is detected before data is output, decoded and displayed.

I claim:

1. Apparatus for reading a data record on which the data is inscribed in an arcuate pattern of equal-radii circular segment spaced lines on a data carrier, comprising:
   a data carrier support for receiving and holding a data carrier;
   a light source operable to emit a beam of light;
   beam directing means for receiving and directing the beam of light toward the supported data carrier, including sweep means for repetitively sweeping the light beam across the data carrier in an arc corresponding to a line of the arcuate pattern;
   a carriage mounting said data carrier support for movement radially of the arcuate pattern;
   incrementing means connected to said carriage and operable between sweeps of the light beam to step said support a distance equal to the line spacing so that the light beam scans one line after another; and
   receiving means mounted to receive the light beam after the same strikes the data carrier.

2. The apparatus of claim 1, wherein:
   said light source is fixed; and
   said beam sweep means is rotatably mounted.

3. The apparatus of claim 2, wherein:
   said light source is fixed to said rotatably mounted beam sweep means.

4. Apparatus for reading digital data which is inscribed in an arcuate pattern on a data carrier, comprising:
   a source of light operable to emit a beam of light;
   mounting means mounting said light source and the data carrier for movement one relative to the other such that the beam of light impinges on the data carrier in accordance with the arcuate pattern and the data correspondingly modulates the beam of light, said mounting means comprising:
   a frame;
   a carriage for holding the data carrier, said carriage mounted on said frame for movement radially of the arcuate pattern; and
   light beam directing means mounted on said frame for rotation to rotate the light beam for arcuate scanning of the data carrier;
   light receiving means mounted to receive the modulated light beam and convert the same into electrical signals corresponding to the data carried by the light beam; and
   means connected to said mounting means and operable to move the same to compensate for manufacturing tolerances of the data carrier and for size changes due to ambient temperature.

5. The apparatus of claim 4, wherein said light source comprises a laser.

6. The apparatus of claim 4, wherein said light beam directing means comprises:
   a substantially disc-shaped member carrying said light source, said disc-shaped member rotatably mounted on said frame.

7. The apparatus of claim 4, wherein said light beam directing means, comprises:
   a member mounted on said frame for rotation; and
   an optical system for receiving the light beam and directing the same along a path toward and which follows the arcuate pattern of the data carrier.

8. The apparatus of claim 7, wherein said light source is mounted on said member.

9. The apparatus of claim 7, wherein:
   said light source is fixed on said frame; and
   said optical system includes the axis of rotation of said member.

10. The apparatus of claim 7, wherein:
    said carriage includes a reflective surface for supporting the data carrier and for reflecting the beam of light after passage through the data carrier; and
    said light receiving means includes a light receiver mounted on said member.

11. Apparatus for optically reading a data record having data inscribed on a data carrier in an arcuate pattern of non-parallel spaced-apart arcuate data paths, comprising:
    a frame structure including a base plate and a rotatably mounted member mounted for rotation parallel to said base plate, and drive means for rotating said member;
    light beam generating means mounted on said frame structure and operable to emit a light beam;
    a carriage to carry the data record mounted on said frame structure for movement radially of the arcuate pattern of the data;
    carriage drive means mounted on said frame structure and connected to and operable to move said carriage in increments each equal to at least an equal division of the incremental distance between the data paths;
    beam directing means mounted on said rotatably mounted member to rotate therewith for directing the light beam along arcuate paths, including beam adjustment means; and
    light beam receiving means mounted on said frame structure for receiving the light beam after the same strikes and is modulated by the data record.

12. The apparatus of claim 11, and further comprising:
    a magnifier adapter mounted on and extending through said base plate for releasably receiving a magnifier as an aid in adjusting said beam adjustment means for adjusting the light beam to the focal plane of said data record.

13. The apparatus of claim 11, wherein said carriage drive means comprises:
    a stepping motor mounted on said base plate and connected to said carriage.

14. The apparatus of claim 11, wherein said carriage includes a pivotally mounted data record support; and further comprising:
    skew correction means connected to said data record support and operable to align the data record such that the arcuate path of the light beam has the same axis of rotation as the arcuate data paths of the data record.

15. The apparatus of claim 14, wherein said skew correction means comprises:
    a motor mounted on said carriage and coupled to said data record support.

16. The apparatus of claim 15, wherein said skew correction means further comprises:

lever means pivotally mounted on said carriage and contacting said data record support; and an output shaft of said motor for moving said lever means.

17. The apparatus of claim 16, wherein said skew correction means further comprises:

bias means urging said data record carrier towards said motor.

18. The apparatus of claim 11, wherein said carriage comprises:

guide track means mounted on said base plate; and wheel means rollingly supporting said carriage along said guide track.

19. The apparatus of claim 18, wherein said wheel means comprises:

a plurality of guide wheels each engaging said guide track means; and a plurality of respective adjustable eccentric wheel mounting devices for adjusting the axis of rotation of said guide wheels with respect to said track.

20. The apparatus of claim 19, and further comprising:

an additional wheel supporting said carriage on said base plate on the side of said carriage opposite said track means.

21. The apparatus of claim 20, and further comprising:

an additional adjustable eccentric wheel mounting device mounting said additional wheel on said carriage and adjustable to level said carriage.

22. The apparatus of claim 11, wherein said carriage comprises:

a data record support including a glass plate.

23. The apparatus of claim 22, wherein said glass plate comprises:

a mirror.

24. The apparatus of claim 22, and further comprising:

a data record holding device on said data record support.

25. The apparatus of claim 24, wherein said data record holding device comprises:

spring means for holding the data record against said glass plate.

26. The apparatus of claim 24, wherein said data record holding device comprises:

a spring having a shape to engage at least one peripheral edge of the data record.

27. The apparatus of claim 24, wherein said data record holding device comprises:

a spring having a shape to engage at least three peripheral edges of the data record.

28. The apparatus of claim 11, wherein:

said light beam generating means and said beam directing means are both mounted on said rotatable member; and said carriage is mounted on said base plate.

29. The apparatus of claim 28, wherein said beam directing means comprises:

beam deflecting means mounted and defining a beam path between said beam generating means and said beam adjustment means, said beam adjustment means including a lens.

30. The apparatus of claim 29, wherein said beam deflecting means comprises:

mirror means.

31. The apparatus of claim 29, wherein said beam deflecting means comprises:

prism means.

32. The apparatus of claim 29, wherein said beam deflecting means comprises:

prism means for directing the light beam towards said lens; and mirror means for directing the light beam towards said prism means.

33. The apparatus of claim 28, wherein said beam generating means comprises:

a source of coherent light.

34. The apparatus of claim 33, wherein said source comprises:

a laser device.

35. The apparatus of claim 11, wherein said light beam receiving means comprises:

a first opto/electronic transducer mounted on said rotatable member for converting the modulated light beam into first electrical signals;

an electro/optical transducer mounted on said rotatable member and connected to said first opto/electronic transducer for converting said first electrical signals into optical signals;

an optical transmission line coupled to said electro/optical transducer and extending along the axis of rotation of said rotatable member; and a second opto/electronic transducer mounted coaxially of the axis of rotation of said rotatable member light coupled to said transmission line for converting said optical signals into second electrical signals.

36. The apparatus of claim 11, wherein said light beam receiving means comprises:

a first opto/electronic transducer mounted on said rotatable member for receiving and converting the modulated light beam into first electrical signals;

a pulse shaping circuit carried on said rotatable member and connected to said first opto/electronic transducer for reshaping said first electrical signals into second electrical signals;

an electro/optical transducer mounted on the axis of rotation of said rotatable member and connected to said pulse shaping circuit for converting said second electrical signals into optical signals; and a second opto/electronic transducer mounted coaxially of the axis of rotation of said rotatable member light coupled to said electro/optical transducer for converting said optical signals into third electrical signals.

37. The apparatus of claim 11, wherein:

said rotatably mounted member carries circuit components requiring first and second ranges of voltages; and shaft means mounting said rotatable member and including a slip ring structure for coupling said voltages of said first and second ranges between the fixed and rotating parts.

38. Apparatus for reading a data record on which the data is recorded on a data carrier in a plurality of spaced non-parallel arcuate data paths, comprising:

a frame including a base plate and a top plate secured together, spaced apart, and substantially parallel to one another, and a wheel rotatably mounted between said base and top plates;

a wheel drive motor coupled to said wheel for rotating the same;

carriage means mounted on said base plate for linear movement radially with respect to the arcuate data paths, including data record support means for supporting a data record;

skew correction means coupled to said data record support means, and operable to correct skew of the data record with respect to the linear movement thereof;

beam generating means mounted on said wheel for rotation therewith, said beam generating means including a laser device operable to emit a coherent light beam;

beam directing means mounted on said wheel for rotation therewith, said beam directing means including lens means for directing a light beam in an arc towards and across the supported data record, beam deflecting means for receiving and deflecting the light beam from said beam generating means to said lens means, and radius correction means including means movably mounting said lens means and operable to move the same to correct the difference between the axes of rotation of said arcuate data paths and said wheel;

beam receiving means for receiving the light beam after the same strikes and is modulated by the data record and converting the same into electrical signals representing the scanned data; and control means connected to said carriage means for incrementing said carriage means, to said skew correction means for controlling skew correction, to said radius correction means for controlling radius correction, and to said beam receiving means for receiving and outputting said electrical signals.

39. The apparatus of claim 38, wherein said beam receiving means comprises:

shaft means rotatably mounting said wheel, including passageway means therein extending to and along the axis of rotation thereof to and exiting at one end thereof; and signal transmission means for transmitting signals through said passageway means to said one end of said shaft.

40. The apparatus of claim 39, wherein said signal transmission means comprises:

a fiber optic extending through said passageway means; and an opto/electronic transducer light coupled to said fiber optic and fixed to said top plate axially of said shaft means and connected to said control means.

41. The apparatus of claim 39, wherein said signal transmission means comprises:

electrical leads extending through said passageway means;

an electro/optical transducer connected to said electrical leads for converting electrical to optical signals; and an opto/electronic transducer light coupled to said electro/optical transducer and fixed to said top plate axially of said shaft means and connected to said control means.

42. Apparatus for reading digital data from a data record on which the data is recorded in a plurality of non-parallel spaced data rows, comprising:

a light source operable to emit a light beam;

beam directing means mounted to receive the light beam and cyclically sweep the beam over a path including a section corresponding to the extent of a data row;

said beam directing means comprising a rotatable member and beam deflecting members carried on said rotatable member;

said light source comprising a laser device mounted on and rotating with said rotatable member;

a movably mounted carriage for supporting the data record in the area of the beam sweep path;

control means connected to said carriage and operable to incrementally move said carriage between beam sweeps of said segment; and light receiving and conversion means mounted to receive the light beam after the same strikes the data record and is modulated by the data and operable to convert the modulated light beam into electrical signals corresponding to the data.

43. A method of reading data from a data record which has data inscribed on a data carrier in non-parallel spaced data rows, comprising the steps of:

mounting the data record on a carriage;

incrementally moved the carriage corresponding to the spacing of the data rows;

generating a light beam;

cyclically sweeping the light beam over the data record along the row path to modulate the light beam with the inscribed data, including adjusting the radius of sweep so that the light beam corresponds with the row path; and receiving and converting the modulated light beam into electrical signals representing the data.

44. The method of claim 43, wherein the step of generating a light beam is further defined as:

generating a coherent light beam.

45. The method of claim 43, wherein the step of cyclically sweeping the light beam is further defined as:

rotating the light beam in a circle.

46. The method of claim 43, wherein the step of cyclically sweeping is further defined as:

directing the light beam over a path including a plurality of segments.

47. The method of claim 46, wherein the step of directing is further defined as:

reflecting the light beam along parallel paths of different vertical position.

48. The method of claim 46, wherein the step of directing is further defined as:

reflecting the light beam along a plurality of paths in horizontal and vertical planes.

49. The method of claim 43, wherein the step of receiving and converting is further defined as: shaping the electrical signals into defined pulses.

50. A method of reading data from a data record which has data recorded on a data carrier in non-parallel spaced arcuate data rows, comprising the steps of:

incrementally moving the data record transversely of the data rows;

projecting a light beam in a plane generally parallel to the plane in which the data record moves;

rotating a deflection structure in the plane of the light beam to deflect the light beam to travel substantially perpendicular to and be swept arcuately across the data record whereupon the data modulates the light beam;

adjusting skew of the data record so that the light beam traverses an arc equal to the arc of a data row; and receiving and converting the modulated light beam into electrical signals.

51. The method of claim 50, wherein the step of projecting a light beam is further defined as:
generating a laser light beam and emitting the same in the plane generally parallel to the plane in which the data record moves.

52. The method of claim 50, and further comprising the step of:
controlling the steps of incrementally moving the data record and rotating the deflection structure to provide incrementation equal to the data row spacing per revolution of the deflection structure.

53. Apparatus for reading digital data which is inscribed in an arcuate pattern on a data carrier, comprising:
a source of light operable to emit a beam of light;
mounting means mounting said light source and the data carrier for movement one relative to the other such that the beam of light impinges on the data carrier in accordance with the arcuate pattern and the data correspondingly modulates the beam of light, including means for correcting skew of the data carrier so that the light beam traverses an arc equal to that of the arcuate pattern, said mounting means comprising:
a frame;
a carriage for holding the data carrier, said carrier mounted on said frame for movement radially of the arcuate pattern; and
light beam directing means mounted on said frame for rotation to rotate the light beam for arcuate scanning of the data carrier; and
light receiving means mounted to receive the modulated light beam and convert the same into electrical signals corresponding to the data carried by the light beam.

54. The apparatus of claim 53, wherein said liquid source comprises a laser.

55. The apparatus of claim 53, wherein said light beam directing means comprises:
a substantially disc-shaped member carrying said light source, said disc-shaped member rotatably mounted on said frame.

56. The apparatus of claim 53, wherein said light beam directing means comprises:
a member mounted on said frame for rotation; and
an optical system for receiving the light beam and directing the same along a path toward and which follows the arcuate pattern of the data carrier.

57. The apparatus of claim 56, wherein said light source is mounted on said member.

58. The apparatus of claim 56, wherein:
said light source is fixed on said frame; and
said optical system includes the axis of rotation of said member.

59. The apparatus of claim 56, wherein:
said carriage includes a reflective surface for supporting the data carrier and for reflecting the light beam of light after passage through the data carrier; and
said light receiving means includes a light receiver mounted on said member.

60. Apparatus for reading digital data which is inscribed in an arcuate pattern on a data carrier, comprising:
a source of light operable to emit a beam of light;
mounting means mounting said light source and the data carrier for movement one relative to the other such that the beam of light impinges on the data carrier in accordance with the arcuate pattern and the data correspondingly modulates the beam of light; and
light receiving means mounted to receive the modulated light beam and convert the same into electrical signals corresponding to the data carried by the light beam,
said mounting means comprising a frame, a carriage for holding the data carrier, said carriage mounted on said frame for movement radially of the arcuate pattern, and light beam directing means mounted on said frame for rotation to rotate the light beam for arcuate scanning of the data carrier,
said carriage including a pivotally mounted data carrier support;
first motor means connected to said carriage for moving the same in the radial direction of the arcuate pattern; and
second motor means connected to said support for pivoting the same to correct for skew.

61. Apparatus for reading digital data which is inscribed in an arcuate pattern on a data carrier, comprising:
a source of light operable to emit a beam of light;
mounting means mounting said light source and the data carrier for movement one relative to the other such that the beam of light impinges on the data carrier in accordance with the arcuate pattern and the data correspondingly modulates the beam of light; and
light receiving means mounted to receive the modulated light beam and convert the same into electrical signals corresponding to the data carried by the light beam,
said mounting means comprising a frame, a carriage for holding the data carrier, said carriage mounted on said frame for movement radially of the arcuate pattern, and light beam directing means mounted on said frame for rotation to rotate the light beam for arcuate scanning of the data carrier;
said light beam directing means comprising a member mounted on said frame for rotation, and an optical system for receiving the light beam and directing the same along a path toward and which follows the arcuate pattern of the data carrier;
said light beam directing means comprising a light directing member in said optical system mounted on said rotatable member for movement in the radial direction with respect to the axis of rotation, and motor means connected to said light directing member and operable to move the same to compensate for manufacturing tolerances of the data carrier and for size changes due to ambient temperature.

62. The apparatus of claim 61, wherein said light directing means comprises:
a beam directing member and a pivotally mounted member carrying said beam directing member; and
said motor means comprising an output shaft coupled to pivot said pivotally mounted member.

63. The apparatus of claim 62, wherein said beam directing member comprises:
a prism.

64. A method of reading data from a data record which has data inscribed on a data carrier in nonparallel spaced data rows, comprising the steps of:
mounting the data record on a carriage;

incrementally moving the carriage corresponding to the spacing of the data rows;
generating a light beam;
cyclically sweeping the light beam over the data record along the row path to modulate the light beam with the inscribed data, including adjusting skew of the data record so that the light beam traverses an arc equal to that of the row path; and
receiving and converting the modulated light beam into electrical signals representing the data.

65. The method of claim 64, wherein the step of generating a light beam is further defined as:
generating a coherent light beam.

66. The method of claim 64, wherein the step of cyclically sweeping the light beam is further defined as:
rotating the light beam in a circle.

67. The method of claim 64, wherein the step of cyclically sweeping is further defined as:
directing the light beam over a path including a plurality of segments.

68. The method of claim 67, wherein the step of directing is further defined as: reflecting the light beam along parallel paths of different vertical position.

69. The method of claim 67, wherein the step of directing is further defined as:
reflecting the light beam along a plurality of paths in horizontal and vertical planes.

70. The method of claim 64, wherein the step of receiving and converting is further defined as:
shaping the electrical signals into defined pulses.

71. A method of reading data from a data record which has data inscribed on a data carrier in nonparallel spaced data rows and in which the data record has a predetermined dimension in the direction of incremental movement, comprising the steps of:
mounting the data record on a carriage;
incrementally moving the carriage corresponding to the spacing of the data rows;
generating a light beam;
cyclically sweeping the light beam over the data record along the row path to modulate the light beam with the inscribed data;
receiving and converting the modulated light beam into electrical signals representing the data;
sensing changes in the predetermined dimension; and
changing the length of the light beam path to compensate for dimensions differing from said predetermined dimension.

72. A method of reading data from a data record which has data inscribed on a data carrier in nonparallel spaced data rows and in which the data record is to be incrementally moved with a predetermined orientation of the data rows, comprising the steps of:
mounting the data record on a carriage;
incrementally moving the carriage corresponding to the spacing of the data rows;
generating a light beam;
cyclically sweeping the light beam over the data record along the row path to modulate the light beam with the inscribed data;
receiving and converting the modulated light beam into electrical signals representing the data;
sensing the orientation of the data rows; and
changing and correcting the orientation in response to sensing skew from said predetermined orientation.

73. A method of reading data from a data record which has data recorded on a data carrier in nonparallel spaced arcuate data rows, comprising the steps of:
incrementally moving the data record transversely of the data rows;
projecting a light beam in a plane generally parallel to the plane in which the data record moves;
rotating a deflection structure in the plane of the light beam to deflect the light beam to travel substantially perpendicular to and be swept arcuately across the data record whereupon the data modulates the light beam;
receiving and converting the modulated light beam into electrical signals; and
sensing and correcting skew of the data record so that the light beam traverses the same arc as that of the data rows.

74. The method of claim 73, wherein the step of projecting a light beam is further defined as:
generating a laser light beam and emitting the same in the plane generally parallel to the plane in which the data record moves.

75. The method of claim 73, and further comprising the step of:
controlling the steps of incrementally moving the data record and rotating the deflection structure to provide incrementation equal to the data row spacing per revolution of the deflection structure.

76. In an apparatus for reading data inscribed in equal-radii arcuate rows on a data carrier carried on a support element in which a light source projects a light beam along a path via a deflection system which includes an optical element which scans the light beam across the data carrier in an arc corresponding to the arc of the rows to modulate the light beam with the data, and in which the modulated light beam is received and converted into electrical signals, the improvement therein comprising:
first means connected to receive electrical signals and operable to produce a control signal when and for as long as the light beam scans portions of more than one row during a scan; and second means connected to said first means and coupled to the data carrier, and operable in response to said control signal to correct the orientation of the data carrier until said control signal disappears.

* * * * *